INVENTORS:
LEWIS M. MOTT-SMITH
BERNARD R. RUMBUTIS
BY S. D. O'Brien
ATTORNEY

March 6, 1956   L. M. MOTT-SMITH ET AL   2,737,344
RANGE AND RANGE-RATE INDICATING UNIT
Filed Aug. 26, 1948   3 Sheets-Sheet 2

INVENTORS
LEWIS M. MOTT-SMITH
BERNARD R. RUMBUTIS
BY
ATTORNEY

March 6, 1956  L. M. MOTT-SMITH ET AL  2,737,344
RANGE AND RANGE-RATE INDICATING UNIT
Filed Aug. 26, 1948  3 Sheets-Sheet 3

INVENTORS:
LEWIS M. MOTT-SMITH
BERNARD R. RUMBUTIS
BY  A. D. O'Brien
Atty.

United States Patent Office 2,737,344
Patented Mar. 6, 1956

2,737,344

RANGE AND RANGE-RATE INDICATING UNIT

Lewis M. Mott-Smith, Houston, Tex., and Bernard R. Rumbutis, Rochester, N. Y.

Application August 26, 1948, Serial No. 46,422

1 Claim. (Cl. 235—61.5)

The present invention relates generally to a combined mechanical and electronic semi-automatic range and range-rate unit, for use particularly with existing radar apparatus. More specifically, it relates to apparatus, circuits and procedures whereby the range and range-rate, that is, the rate of change of range of a target with respect to the radar location may be determined, and whereby various voltages proportional to the range and range-rate are provided, for any desired purpose, for instance, to actuate remote indicators and computers associated with gun fire control equipment.

The device depends on the fact that the target distance is proportional to the time required for a radiated impulse to travel to a target and its echo to return. The measurement of this time is made by aligning an echo pip and a range marker pip on a conventional radar cathode ray tube indicator, the position in time of the range marker being accurately known with respect to the radiated impulse. The range and range-rate unit converts this time into determinations of range and provides electrical outputs which are proportional to the range and range-rate.

The primary object of the invention is to make use of radar apparatus to measure and indicate continuously the distance to the target, as well as the rate at which this distance is changing, so that such information may be used for computing information to be utilized by gun fire control equipment or for any similar purposes.

Another object is to provide improved aided tracking. In order to comprehend what is meant by this, it is desirable first to define tracking. Tracking in range is used here to designate the act of changing the range marker of the radar apparatus to keep it coincident with the echo "pip" of a moving target. In "unaided" or manual tracking, the position of the marker or notch on the screen of the cathode ray tube is controlled entirely by the operator, who turns a range control crank to keep the marker pip and echo pip matched, without semi-automatic electro-mechanical aid. In aided tracking, after alignment has once been attained, the operator merely provides the corrections required to keep the marker pip and echo pip in coincidence.

To provide aided tracking, the first operation is to establish the range-rate of the moving target, that is, its velocity relative to the radar location. It is necessary also to have electro-mechanical drive means, including a motor, arranged to operate in parallel with the manually operated range crank employed to keep the range marker and the echo pip in coincidence, whose rate of changing the position in time of the range marker depends upon the established range-rate. Further, this system of tracking is such that, when error develops between the position of the range marker and that of the target echo, a change in the range-rate to bring the marker pip and echo pip into coincidence is accomplished by operating the range control crank which simultaneously adds an increment to the range. Thus, an aided tracking mechanism will track a target whose range is changing uniformly, after a few manual adjustments of the range control crank.

The aided tracking device of the present invention is an improvement over that described in the publication by the Bureau of Ships dated January 20, 1943, entitled, Instruction Book for Radar Equipment Mark 19, at pages 36–39 of Section C. The aided tracking device therein described consists of a variable speed motor drive and gearing arranged to operate in parallel with a manually operable crank. The crank and the motor drive are coupled by a friction device in such a manner that the range crank operates the range tracking mechanism directly and controls the friction device to adjust the rate at which the motor drive operates the tracking mechanism.

According to the present invention, the task of maintaining the marker in coincidence with the echo pip is performed by an electro-mechanical system including a servo mechanism specially provided and designed for such purpose. The operator establishes the rate at which the target range is varying by means of the range control and by this operation sets a range-rate shaft and dial accordingly. This provides a voltage proportional to range-rate which controls a tracking speed of the motor, which is linked to electrical components in the range unit that cause the marker to travel at a corresponding rate, which should keep it coincident with the echo pip, and also provide an output proportional to range. In case the operator sets the range-rate incorrectly, the marker will move out of the desired coincidence, and can be made to agree again only by adding a suitable plus or minus increment to the setting of the dial. This dial will, incidentally, show the true range-rate, when so adjusted.

This portion of the range unit constitutes the aided tracking means, which provides a motor drive for range tracking at a rate which may be pre-set in the apparatus. However, a clutch is provided to shift from the aided tracking condition to the manual tracking condition. When the aided tracking mechanism is disengaged, tracking is done by manually cranking in range and the range-rate separately. In addition, the present range and range-rate unit includes a slewing motor which can be put into operation when very rapid changes in the position of the range marker are required.

While certain features and objects of the invention are generalized above, other objects and many of the attendant advantages will be appreciated and understood most readily from a disclosure of a specific embodiment thereof, as illustrated in the accompanying drawings and described herein.

Figure 1:
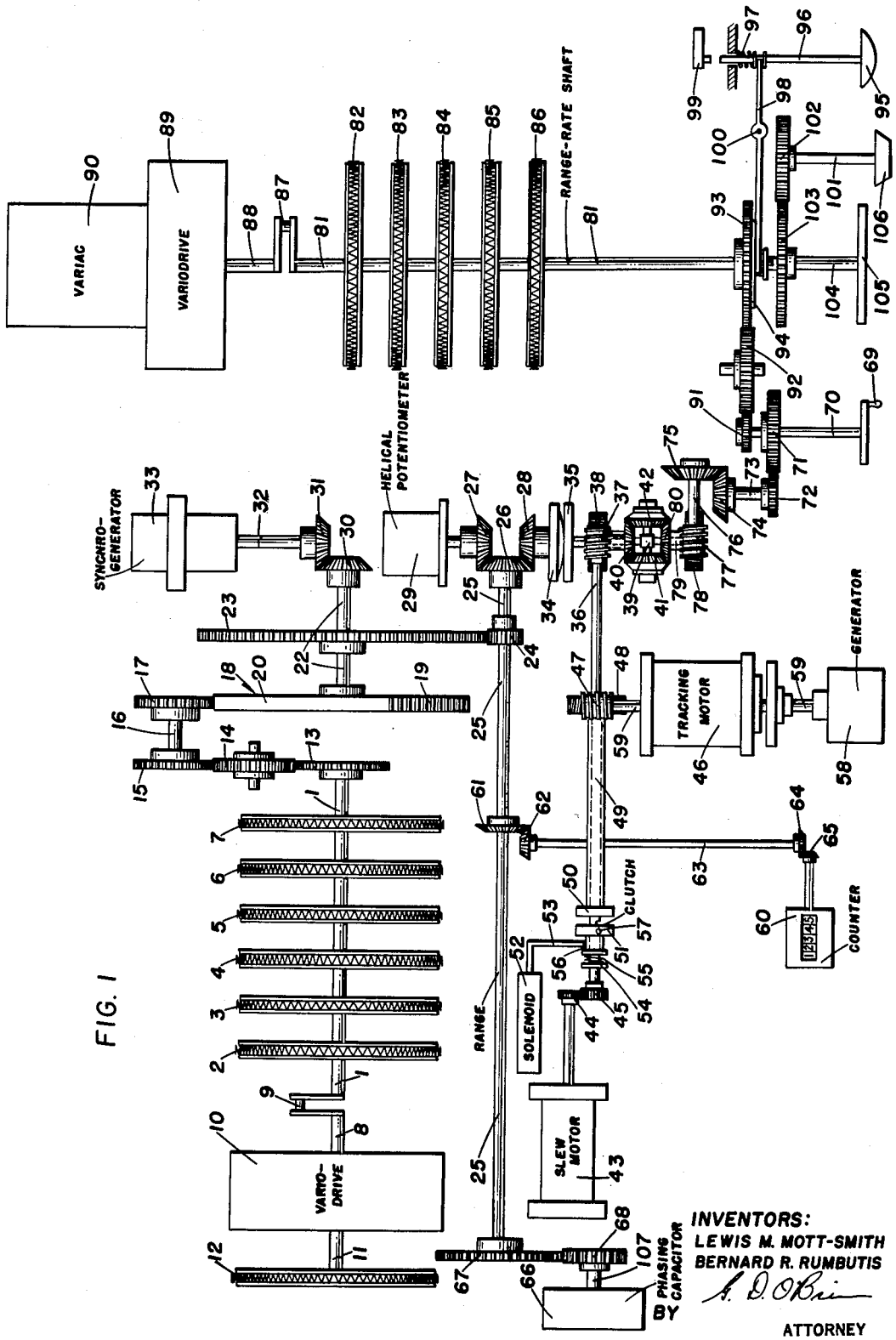
Figure 1 is a diagram showing the assembled mechanical features of the entire device.
Figure 3:
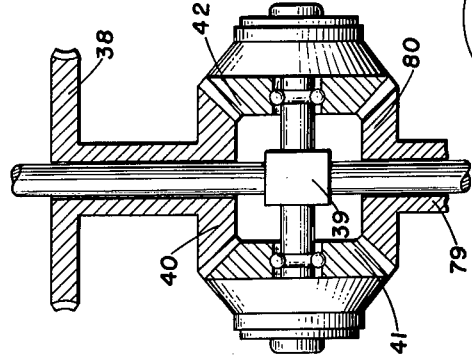
Figure 3 is a detail of a differential interposed between the range mechanism and the range-rate mechanism of Figure 1.
Figure 5:
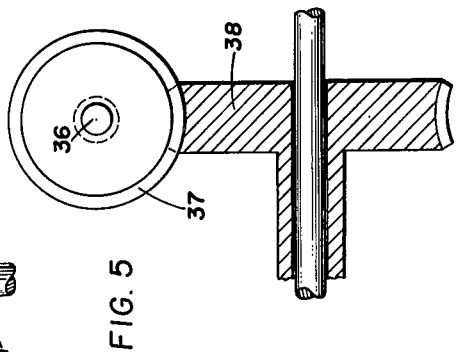
Figure 5 is a detail of a worm drive located between the shaft of the tracking motor and a sleeve driven thereby.

Referring first to Figure 1, the mechanical system comprises two parts, one concerned with range, the other with range-rate, and shown respectively at the left and right sides of the figure.

A manually operated range crank 69 is connected by intermediate gearing, to be explained later, to the range output portion of the unit which includes shaft 1 on which are mounted six range output potentiometers, 2, 3, 4, 5, 6 and 7. On the shaft 8, alined with shaft 1 and connected thereto by the coupling 9, there is mounted a variodrive 10 which in turn actuates the shaft 11 with an angular motion different from that of shaft 8, and, of course, actuates the range output potentiometer 12 mounted thereon at a corresponding speed. These range output potentiometers provide information in the form of voltages determined by rotation of the respective shafts, which information is suitable for use by computers in the particular gun director system with which the radar is used.

Figure 2:
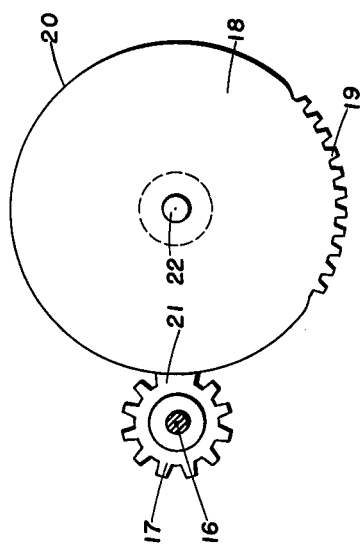
Figure 2 is a diagram of an intermittent gear drive mechanism embodied in the same.

For rotating the shaft 1 and the potentiometers carried thereby, the shaft has mounted on it the gear 13, which, through idler 14, gear 15, shaft 16 and intermittent pinion 17, is driven by the correspondingly intermittent gear 18. Reference to Figure 2 shows that the gear 18 carries the proper number of teeth 19, which here occupy slightly less than one quarter of its periphery, the remainder 20 being uniformly cut to approximately the pitch circle, which fits against a concave projection 21 on the pinion 17 between the toothed portions so that the smooth part of the gear 18 merely slides on said concave part 21 of pinion 17 except when the teeth 19 are actually engaging their companion teeth on the pinion 17. The potentiometer shaft 1 thus can be driven only to an extent corresponding to the toothed portion of the driving gear 18, multiplied by the gear ratio, but in all cases somewhat less than one full turn. The intermittent gear is provided because the operating range of the particular computer with which this range and range-rate unit may be used is considerably less than the operating range of radar.

The gear 18 is mounted on shaft 22 which also carries gear 23 in mesh with pinion 24 on shaft 25. The shaft 25 is driven by the bevel gear 26 which is in mesh with bevel gears 27 and 28, driving the gear 27 and itself in turn being driven by the gear 28. The gear 27 actuates the helical potentiometer 29, that is, a helically arranged resistor for a purpose that will be explained hereinafter. On the shaft 22 there is another bevel gear 30 in mesh with a companion 31 on the shaft 32 of a synchro-generator 33, which transmits the range indication to a control room.

A range counter 60 is driven from the shaft 25 through gears 61 and 62, shaft 63, and gears 64 and 65. It may be any register or counter of conventional form, such as the "Veeder" type customarily used in odometers or other revolution counters. The phasing capacitor 66 is also driven from shaft 25, through gears 67 and 68, for a purpose that will be described hereinafter. The ratios of the various gears interconnecting the shaft 25, the range counter 60, the phasing capacitor 66, and the helical potentiometer 29 are chosen so that a change in range of a given predetermined amount as indicated by the range counter provides a corresponding rotation of the respective shafts of the phasing capacitor and the helical potentiometer. In this manner a fixed relationship is maintained between these components, which is also correlated with the range indication. Similarly, the ratios of the gears interconnecting the shaft 25, and the shafts 1, 11, and 32 which are associated with the range output potentiometers and the range indicating synchro-generator are such that the magnitude of the voltages governed by the potentiometers and the generator bear fixed relationships to each other and to the actual range.

The shaft 25 is driven through the slip clutch 34–35 on the shaft of the bevel gear 28. The element 35 of this clutch may be driven alternatively by manual means and by a motor, or by both at once, the motor and manual means being connected in parallel and their respective outputs being fed to a differential gear, to provide aided tracking as will now be described.

A shaft 36 carries a worm 37 in mesh with a worm wheel 38 mounted on one outer tubular shaft of the differential 39 and thus when shaft 36 is rotated it will cause rotation of bevel gear 40 which in turn will cause the two bevel gears 41 and 42 carried by the cross shaft to rotate the shaft carrying 35 at half the speed of the gear 40.

Figure 4:
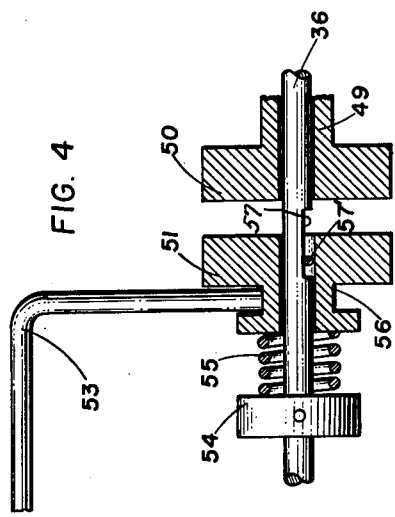
Figure 4 is a detail of a solenoid-actuated clutch for putting the tracking motor into and out of service.

Shaft 36 may be rotated by the tracking motor 46 through the worm 47 carried by the shaft 59 of the tracking motor and meshing with the worm wheel 48 on tubular shaft or sleeve 49, through the engagement of the clutch 50, 51 by means of the spring 55. (See also detail on larger scale, Fig. 4.) Shaft 36 may be rotated also by the slew motor 43, through gears 44 and 45, when said motor is running, and the clutch 50, 51 is disengaged by the solenoid 52.

It will be seen that the clutch comprises the two flanges 50 and 51, one of which, 50, is integral with, or secured to the sleeve 49 while the other, 51, is slidable on said shaft 36 and under the control of a bent lever 53 whose end engages in a groove 56 in the hub of flange 51. A collar 54 is secured to the shaft 36 and a helical spring 55 tends to push the flange 51 toward the flange 50. A slot-and-pin connection shown at 57 and 57', respectively, allows the flange 51 to shift along the shaft 36, while continually maintaining a driving connection therebetween. Thus sleeve 49 can drive the shaft 36 only when the clutch is engaged, that is, when the lever 53 does not pull the clutch flanges apart, in opposition to the spring 55.

Figure 6:
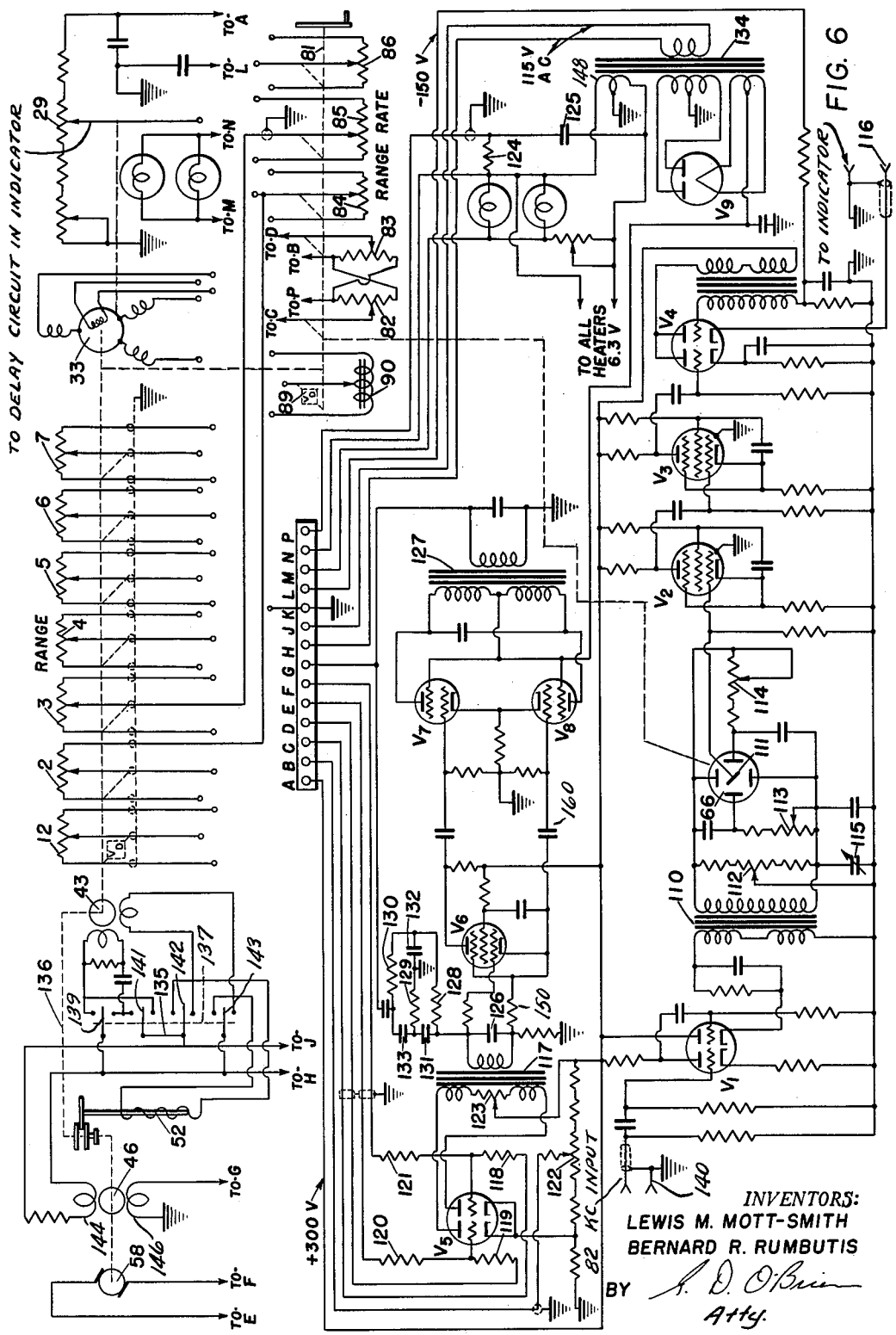
Figure 6 is a diagram of the electrical connections.

A direct current generator 58 is also connected to the shaft 59 of the tracking motor and its output is fed back to the control grids of a tube $V_5$ in the servo amplifier, shown in Fig. 6, to hold constant the speed of the tracking motor 46 after it has attained the required speed.

As already stated, the clutch lever 53 operated by the solenoid 52 acts against the spring 55, and disengages the clutch whenever the slew motor 43 is in operation. Thus the slew motor 43 may cause relatively rapid rotation of the shaft 36 whenever desired, unhampered by the tracking motor. Solenoid 52 is operated by microswitch 99 in a manner that is explained later.

The manual actuation of shaft 25 is accomplished by means of the crank 69 on shaft 70. Through gears 71, 72, shaft 73, bevel gears 74, 75, shaft 76 and worm 77, this drives the worm wheel 78 also acting on the differential, through sleeve 79 and bevel gear 80. It will be seen that bevel gear 80 is in exactly the same relation to the differential as is bevel gear 40, which is the motor-driven gear. Hence, turning the crank 69 will also turn bevel gear 28, through the clutch 34, 35, and will thus actuate the shafts 25 and 1 and the intermediate gearing manually.

The remaining portion of the mechanical apparatus shown in Fig. 1 concerns the range-rate output potentiometers and related devices. The range-rate shaft 81 carries the range-rate output potentiometers 82, 83, 84, 85 and 86, and is connected by coupling 87 to the shaft 88 which operates variac 90 through the variodrive 89. The magnitudes of the voltages from the potentiometers and the variac are governed by the rotation of the range-rate shaft 81, which in turn bears a fixed relationship to the rotation of the crank 69.

A connection is provided between the hand crank 69 and the shaft 81, by means of a pinion 91 on shaft 70, an idler gear 92, and the gear 93 mounted on shaft 81, but which is loose thereon until a slip-clutch 94 causes it to engage. This is accomplished by the emergency selector device, operable by the knob 95 on shaft 96. This shaft is movable longitudinally against the force of the helical spring 97, which normally maintains the clutch engaged. This shaft does two things, namely, it shifts the clutch lever 98, pivoted at 100, and also actuates the switch 99, which controls the solenoid 52, to throw the tracking motor 46 out of service and to energize the slew motor for rapid changes of the range notch. The electrical connections between these elements are described hereinafter in connection with Fig. 6.

In order to operate the shaft 81 independently, in case of failure of the aided tracking mechanism the range-rate knob 106 on shaft 101 is turned, to rotate gear 102, which is in mesh with gear 103 on shaft 81. When the clutch 94 is disengaged, the gear 93 will, therefore, no longer turn the shaft 81, so that crank 69 will then control only the range setting. A forward extension 104 of shaft 81 carries the range-rate dial 105. This completes the mechanical features of the apparatus.

The electrical circuits will now be described briefly, with particular reference to Figure 6.

The electrical system of the range measuring circuits inslued in the range unit comprises electronic tubes $V_1$, $V_2$, $V_3$ and $V_4$ together with the phasing capacitor 66 and the helical potentiometer 29. It should be pointed out that the phasing capacitor 66 is driven by shaft 107 which is geared to shaft 25 at a 2:1 ratio. The shaft 25 turns at such rate that each turn corresponds to 4,000 yards change in the range, hence the shaft 107 which actuates the phasing capacitor operates at the rate of 2,000 yards per turn.

The helical potentiometer 29, however, is geared to the same shaft 25 through the equal bevel gears 26 and 27, consequently it turns at the same rate as shaft 25, that is, 4,000 yards per turn. Although this potentiometer 29 has a ten-turn helically arranged winding, only eight turns are utilized, so that the total range covered is 8 times 4,000 yards, or 32,000 yards. The phasing capacitor 66 meanwhile makes sixteen turns, each corresponding to 2,000 yards.

The first unit of the twin triode $V_1$ is connected as an amplifier for the 82 kc. (more exactly, 81.94 kc.) timing wave generated in the radar and fed into the range measuring circuit at the plug connection 140. This frequency is chosen because each cycle is equivalent to 12.2 microseconds or 2000 yards of range. The second unit of $V_1$ is connected as a cathode follower, to provide a low impedance match, to drive transformer 110. The output of this transformer supplies the bridge circuit shown, from which are derived four equal voltages differing in time phase by 90°. This condition may be attained by adjusting the potentiometers 112, 113, and 114, and the capacitor 115. These voltages, when applied to the phase-shifting capacitor 66, make it possible to obtain an 82 kc. sine wave output that may have any phase relationship from zero to 360° with respect to the voltage at the transformer terminals. Furthermore, the phase shift is linear with respect to the angle of rotation of the capacitor element.

As the phase-shifting capacitor 66 is of somewhat unusual structure, it may be well to explain here that it consists essentially of four quadrant-shaped stators arranged about their common center, in a plane, a single large circular stator 111 being placed opposite and parallel to all of them, and a plate of dielectric material, not shown, which may also be circular, being mounted eccentrically and rotating about said center in a plane between the sectors and the large stator, so as to affect the capacitances in periodic order. The details of the construction of this capacitor are disclosed in U. S. Patent No. 2,422,204, granted to L. A. Meacham on June 17, 1947.

Due to the mechanical gearing already described, the rotatable dielectric turns at such rate that each turn represents 2,000 yards, that is, the phase of the 82 kc. timing wave is shifted through 360° for each 2000 yards in range. The output of the phase-shifting capacitor 66 is amplified by tube $V_2$, shown here as of type 6AC7W, which is connected to have considerable negative feedback, to reduce the load on the phase-shifting capacitor 66.

The 82 kc. energy is next amplified by $V_3$ and the first unit of twin triode $V_4$, and is then coupled into the second unit of $V_4$, acting as a blocking oscillator, which produces a pip for each cycle of the 82 kc. timing wave. The output from the cathode of this blocking oscillator, which may conveniently be delivered at jack 116, therefore consists of a string of pulses or pips 12.2 microseconds apart, corresponding to the time required for a radio wave to travel to, and return from, a target 2,000 yards distant. These 2,000 yard pips are continuously variable in position, depending on the adjustment of the phasing capacitor 66.

This string of pips is applied to the first grid of a coincidence tube in the indicator unit, not shown. This tube is a pentode, such as type 6AC7, whose third grid is biased to prevent all except one of a given series of these pips from appearing in its anode circuit. The turn-on time for the selection of the pip is controlled by the position of helical potentiometer 29. This may be considered as part of a conventional radar circuit, mentioned here for understanding of the device, but not forming a part of the feature herein concerned as novel and/or patentable. The general manner in which these components are combined for the purpose of pulse selection in a radar range measuring circuit is illustrated in U. S. Patent No. 2,422,204, granted June 17, 1947, to L. A. Meacham. This patent discloses a range indicator for use in radar including a source 20 of 65.57 kc. timing waves, controlled by a start-stop circuit 16 which is synchronized with the transmission of a high-frequency pulse from the radar. The timing waves are supplied to a phase shifter circuit 21. The latter includes means for providing four voltages, displaced in phase by 90° to each other, to the four stator sections 81, 82, 83 and 84 of a phase shifting capacitor C27. As in the present application, this capacitor is provided with a ring stator 86 and a dielectric rotor 87 for continuously shifting the phase of the timing waves. The output of the phase shifter is supplied to the timing pulse generator 23 which provides a pulse corresponding to the beginning of each half cycle of the timing wave. The selection of the proper one of the timing pulses for use as a range marker is accomplished by the delay circuit 23 which includes a variable resistor R52 that functions in the same general fashion as the helical potentiometer 29 of the present range and range-rate unit. The resistor R52 is part of an R—C circuit and its setting, acting in conjunction with one of the timing pulses supplied from the timing pulse generator 22, determines the time of conduction of tube 98. The output of the delay circuit is used to control a pedestal and sweep wave generator 25. The pedestal is applied to the grid of tube 116 in the step generator and the timing impulses are applied to the same grid. In this manner the timing impulse to be used as a range marker is superimposed on the pedestal. The pedestal with the superimposed range marker, and the sweep wave are applied to the vertical and horizontal plates, respectively, of a cathode ray tube 30. The received echo is also applied to the tube 30. The shaft 29 of the phase shifter 21 and the shaft 34 of the variable resistor R52 in the delay circuit 23 are interconnected by gears 24 so that the change in the time constant of the R—C circuit is proportional to the phase shift of the timing wave. By rotating these shafts, the echo pip and the range marker can be aligned. A range counter 150 connected to the shaft is calibrated to indicate the distance in yards corresponding to the time required for the echo to travel to a target and return.

The publication by the Bureau of Ships entitled, Instruction Book for Radar Equipment Mark 19, dated January 20, 1943, similarly discloses the manner in which these components may be connected in a radar. A range unit and an aided tracking unit which may be regarded as prior art devices with respect to the present invention are described in paragraphs 7.1 and 7.2 and Figs. 66 and 67 appearing on pages 30 to 39 and 67 to 69, respectively, of Section C, entitled Detailed Electrical Characteristics. Referring particularly to Fig. 67 on page 69 and the descriptive material on pages 36, 37, 38 and 39, aided tracking is accomplished by a motor and a variable speed drive connected in parallel with a manually operated range crank. By means of appropriate gearing, the range crank drives the tracking mechanism itself and also controls the rate at which the tracking mechanism is driven by the motor. It can be seen that output shafts driven by gears labeled C and J are used to drive a specially wound range potentiometer R-567 (see page 35, second column, lines 7, 8 and 9) and a phase shifter capacitor C-525 respectively. The potentiometer R-567 and capacitor C-525 are a part of the range unit electronic circuit shown in Figs. 36 and 66 on pages 30 and 67, respectively, and described on pages 30 to 36. A timing wave comprising a train of oscillations at a frequency of 81.955 kc. is produced by the circuit including $V_{502}$, $V_{503}$, $L_{502}$ and $C_{513}$. This circuit is controlled by a start-stop multivibrator comprising tubes $V_{501}A$ and $V_{509}A$ which is turn controlled by a pulse from the radar modulation generator. The last named pulse is synchronized with the pulse transmitted from the radar. Tube $V_{503}$ provides two outputs 90° apart in phase which are converted to four output voltages 90° apart in phase by twin triode $V_{504}$. These four voltages are supplied to the four stator sectors of the phase shifter capacitor C-525. As in the present application, it is the function of the capacitor C-525 to provide a timing wave comprising train of oscillations at 81.955 kc. whose phase with respect to the timing wave input to $V_{503}$ depends on the capacitor rotor position. The timing wave is then amplified by $V_{505}$ and $V_{506}$. The amplified timing wave is clipped and inverted by the stage including tube $V_{507}$. The pulses thus produced are used by the circuit including $V_{508}$ to produce positive pulses which are differentiated by the combination of C-536 and R-561 to produce trains of pips which correspond to the zero points of the timing wave from C-525. The circuit including $V_{501}B$ and C-523, C-538, and C-539 utilizes a square wave from the start-stop multivibrator $V_{501}A$ and $V_{509}A$ and these pips, to apply an exponentially increasing voltage having the pips superimposed to the grid of tube $V_{510}$. The cathode voltage of $V_{510}$ is controlled by a voltage divider including potentiometer R-567 so that by rotating potentiometer, the cut-off voltage of $V_{510}$ can be adjusted. Thus, the potentiometer R-567 controlling the cathode voltage of $V_{510}$ is utilized to accomplish the selection of a timing pulse which after further shaping and inversion is supplied as the range pulse to indicator circuit schematically illustrated in Fig. 18 on page 16. It can be seen that the position of the range pulse relative to a target echo on the oscilloscope is determined by the amount of delay introduced by the range crank and tracking motor in the range unit.

The various potentiometers 12, 2, 3, 4, 5, 6, 7, 82, 83, 84, 85 and 86 shown as mechanical structures in Fig. 1, appear as electrical symbols, identified by the same respective reference characters, in Fig. 6. The shaft operating the potentiometers of the range unit drives also the synchro-generator 33, through suitable gearing indicated in Fig. 1, the gear ratio being such that while the potentiometers 2, 3, 4, 5, 6 and 7 make one turn per 10,000 yards, the synchro-generator operates at one turn per 36,000 yards. The output of the synchro-generator may be used for remote indication.

The connections of the slew motor 43, and the solenoid 52 cooperating therewith are also shown diagrammatically in Fig. 6, a mechanical connection being indicated by the continuation of the dashed line 136. Finally, the tracking motor 46 and the generator 58 are also indicated along the same mechanical connection. Means for actuating the slew switch 135, shown diagrammatically at the upper left hand corner of Fig. 6, is mounted on adjacent the other controls of the range unit, as indicated in Fig. 1. Actuation of the shaft 96 in the manner hereinbefore described will acuate a mechanical connection indicated by the dashed line 137 between pairs of movable contacts 139, 141 and 142, 143 of the slew switch 135. Moving these contacts towards the top of the sheet in Fig. 6 will energize the solenoid 52, thereby disconnecting the tracking motor from the shaft 36 and energizing the slew motor 43 (Fig. 1) for rotation in one direction to provide rapid changes of range necessary, for example, in moving to track a new target. Moving these contacts downward will also energize the solenoid and the slew motor, the latter for rotation of its output shaft in the other direction.

Tracking motor 46 is a two-phase motor and has two windings 144 and 146, one of which receives energy directly, or through a suitable transformer, from the 115 volt A. C. power line supplied to the two terminals H and J. The second winding 146, however, must be fed energy at a phase which differs by approximately ninety degrees from that of the power line, supplied between the terminal G and common. The direction of rotation of the motor depends upon whether this voltage lags or leads the voltage feeding the first winding. The speed of rotation depends upon the magnitude of the said second voltage.

A servo-amplifier is provided to supply this energy to the second winding and to establish the magnitude and phase relation to give the speed and direction of rotation determined by the setting of the dual potentiometer 82, 83 on the range-rate shaft 81. This servo-amplifier, which is shown very diagrammatically in the central part of Fig. 6, comprises the electronic tubes $V_5$, $V_6$, $V_7$, $V_8$ and $V_9$ and the circuits coacting therewith.

Power for the second winding of the tracking motor 46 is delivered between terminal G and common from the servo-amplifier output transformer 127 as a result of feeding a low valve A. C. voltage from a filament supply winding 148 of the power transformer 134 to the grids of $V_5$ connected as a differential amplifier. To provide voltage leading the line voltage by 45°, this filament voltage is phase-shifted by means of resistor 124 and capacitor 125. This A. C. voltage is injected into the grids of $V_5$ through the dual potentiometer 82, 83. The circuit can be traced from the junction of resistor 124 and capacitor 125 to terminal P at one end of the winding of potentiometer 82, through said winding and terminal B to the slider of a potentiometer 122 which is part of a voltage divider network connected between the 300 v. source and ground. The range-rate dual potentiometer is thus also part of a D. C. voltage divider. The potentiometer 122 is used to adjust the quiescent plate current in the two sections of the differential amplifier $V_5$. The sliders of the potentiometers 82 and 83 are connected through terminals C and D and resistors 118 and 119 to the right hand and left hand grids respectively of $V_5$.

The zero-output position for this servo-system is with the range-rate potentiometer slider in its mid-position. This corresponds to the balanced condition of the differential amplifier $V_5$, under which condition equal and opposite voltages are developed in the primary winding of transformer 117. The direction of rotation of the tracking motor 46 is determined by the direction of the unbalance of amplifier $V_5$, that is, of movement of this potentiometer. When the potentiometer is rotated to a given range-rate, the input to tube $V_5$ becomes unbalanced. This results in unequal primary currents of similar phase in the transformer 117. Since the anodes of $V_5$ are connected to opposite ends of the transformer windings, only the difference in anode currents produces an alternating voltage in the secondary. Potentiometer 123 is provided to balance out any inequality in the two units of tube $V_5$ and its associated circuits. This is done by setting the range-rate potentiometer 82, 83 at zero and adjusting the potentiometer 123 until the tracking motor comes to a stop.

The phase of this voltage depends upon which anode current of $V_5$ is the greater; thus, the phase of the voltage can be reversed by reversing the direction of rotation of the dual potentiometer 82, 83. Final correction to provide a 90° phase shift between the resultant voltage from $V_5$ and the line voltage supplied to winding 144 of the two-phase tracking motor 46 is accomplished by the capacitor 126 across the secondary winding of transformer 117. This phase shift when added to that provided by the combination of resistor 124 and capacitor 125 will give a total shift of 90° at the output of transformer 127.

The voltage appearing at one end of the secondary winding of transformer 117 is applied through resistor 150 and blocking capacitor 160 to the control grid of $V_8$ which is one section of a power amplifier circuit. Tube $V_7$ is the other section of the power amplifier and, to provide a voltage at the control of $V_7$ that is out of phase with the voltage applied to the grid of $V_8$, the voltage appearing at the other end of the secondary winding of transformer 117 is applied to the control grid of tube $V_6$ which is connected as a paraphase amplifier. With the differential amplifier $V_5$ in the balanced condition, tubes $V_7$ and $V_8$ conduct equal plate currents which are cancelled in the primary of transformer 127, resulting in no current flow in the secondary of transformer 127.

After amplification by $V_6$, $V_7$ and $V_8$, the alternating voltage in the secondary of transformer 127, applied to the field winding 146 causes the tracking motor 46 to rotate at speed proportional to the unbalance of potentiometer 82, 83. This in turn causes D. C. generator 58 to develop a voltage proportional to this speed. Inverse feedback is provided by connecting the output of the D. C. generator 58 to the grids of $V_5$ through the resistors 120 and 121.

The polarity of this D. C. output depends upon the direction of rotation and is always such as to tend to rebalance the input to $V_5$. This reduces the A. C. output of the servo-amplifier, until it is just sufficient to maintain the speed of the tracking motor at a value determined by the original unbalanced condition of the dual potentiometer 82, 83.

Resistors 128, 129 and 130 and capacitors 131, 132 and 133 form a "twin-T" feedback network giving negative feedback between the output of the servo-amplifier and the input to $V_6$. This improves the 60 cycle wave form of the voltage and further serves to dampen any oscillation-tendency of the overall system.

The voltage supply for the dual potentiometer 82, 83, is regulated to maintain a constant calibration for the range-rate shaft. The constant of proportionality may be varied by adjustment of the slider of resistor 122.

Since the two amplifier output tubes $V_7$ and $V_8$ require considerable power to operate them, a power supply comprising the rectifier tube $V_9$ is provided. This is operated by the transformer 134, and its output need not be filtered nor even closely regulated.

Obviously many modifications and variations of the present invention are possible in the light of the above teachings. It is therefore to be understood that within the scope of the appended claims the invention may be practised otherwise than as specifically described.

We claim:

A range and range-rate apparatus for use with a radar apparatus comprising, a first shaft, means for rotatably mounting said first shaft, means adapted to be actuated by said first shaft for providing a voltage whose magnitude is proportional to the range of a target being tracked by said radar, a differential gear having its output connected in driving relationship with said first shaft, an electric motor, electromagnetically operated means normally connecting the electric motor to the first shaft for providing one of the inputs to said differential gear, a slew motor connected to said first shaft and operable for providing rapid rotation thereof whereby a rapid change in tracking may be effected in response to a sudden change in target range, a manually operated crank connected to said differential gear for providing the other input to said differential gear, whereby both said crank and said electric motor can rotate said first shaft, said electromagnetically operated means including a clutch for disconnecting said electric motor from said first shaft during operation of said slew motor, a second shaft rotatably mounted adjacent said crank, means adapted to be actuated by said second shaft for providing a voltage proportional to the rate of change of range of a target being tracked by said radar, means also connecting said crank in driving relationship with said second shaft so that said crank can be rotated to adjust the voltage proportional to the rate of change of range, whereby when said crank is rotated to change the voltage proportional to the rate of change of range a corresponding change is made in the voltage proportional to range, a servo amplifier to which said voltage proportional to the rate of change of range is supplied, and means for supplying the output of said amplifier to said motor for driving said motor at a speed proportional to said rate of change of range.

References Cited in the file of this patent

UNITED STATES PATENTS

| | | |
|---|---|---|
| 1,461,956 | Wood | July 17, 1923 |
| 1,927,702 | Foss | Sept. 19, 1933 |
| 1,950,187 | Mansel | Mar. 6, 1934 |
| 2,417,229 | Alexanderson | Mar. 11, 1947 |
| 2,426,658 | Wooldridge | Sept. 2, 1947 |
| 2,467,208 | Hahn | Apr. 12, 1949 |
| 2,516,765 | Ferrell | July 25, 1950 |
| 2,572,986 | Chance | Oct. 30, 1951 |
| 2,573,840 | Grass | Nov. 6, 1951 |